O. SCHMITZ.
DEVICE FOR DETERMINING THE REQUIRED SIGHT ADJUSTMENT FOR INDIRECT FIRING.
APPLICATION FILED OCT. 19, 1911.
1,171,465.
Patented Feb. 15, 1916.
2 SHEETS—SHEET 1.
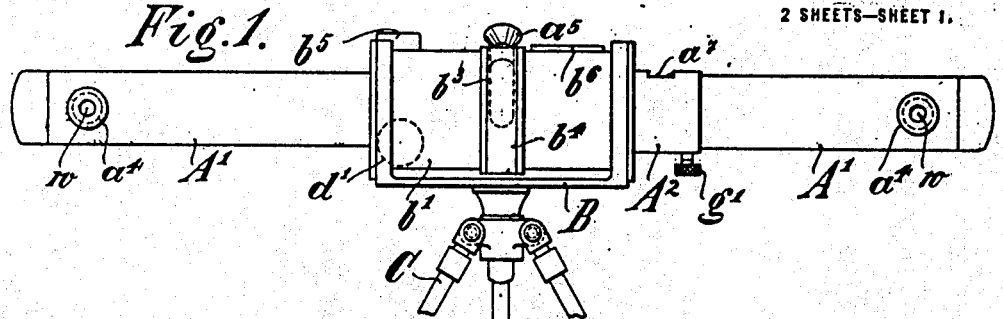
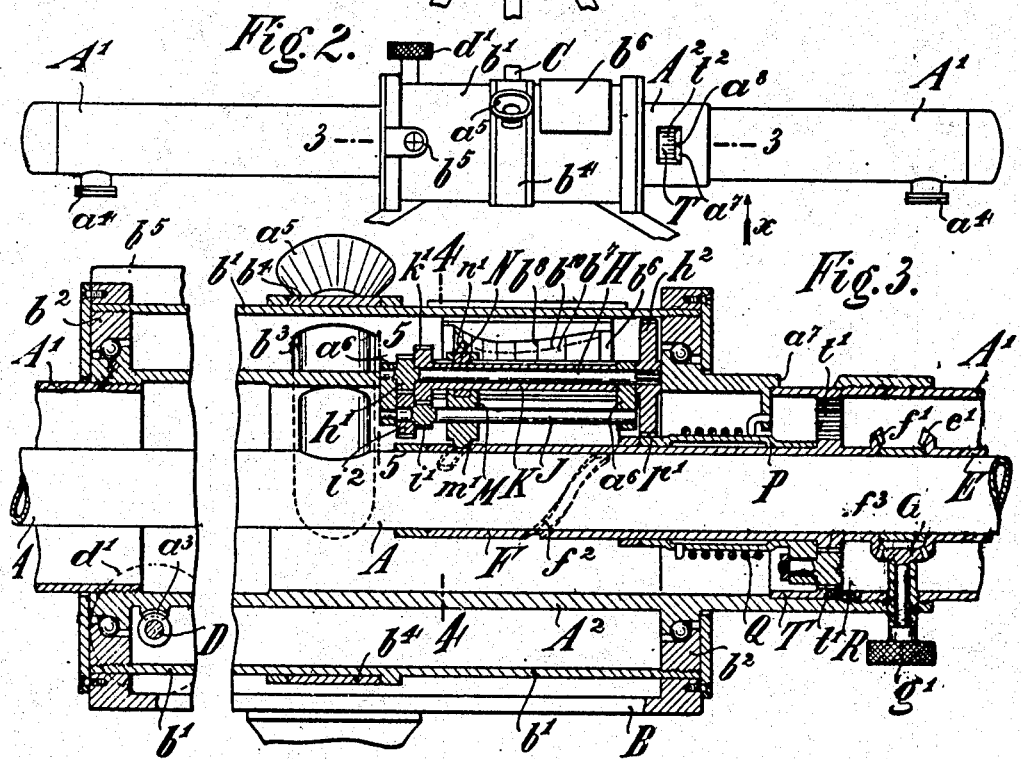
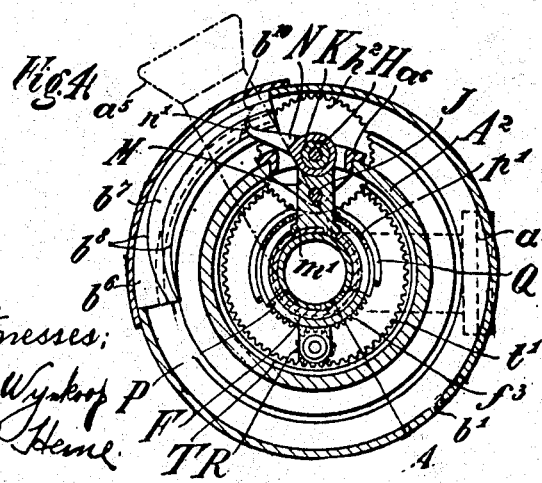
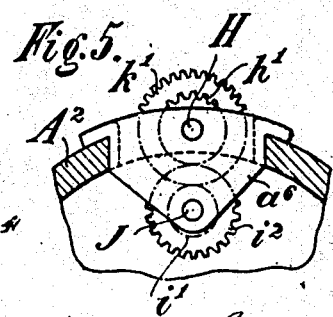
Witnesses:
J. M. Wyckoff
C. R. Heine
Inventor:
Otto Schmitz
By Knight Bros.
Attys.

UNITED STATES PATENT OFFICE.

OTTO SCHMITZ, OF ESSEN-ON-THE-RUHR, GERMANY, ASSIGNOR TO FRIED. KRUPP AKTIENGESELLSCHAFT, OF ESSEN-ON-THE-RUHR, GERMANY.

DEVICE FOR DETERMINING THE REQUIRED SIGHT ADJUSTMENT FOR INDIRECT FIRING.

1,171,465.  Specification of Letters Patent.  Patented Feb. 15, 1916.

Application filed October 19, 1911. Serial No. 655,587.

*To all whom it may concern:*

Be it known that I, OTTO SCHMITZ, a subject of the Emperor of Germany, and a resident of Essen-on-the-Ruhr, Germany, have invented certain new and useful Improvements in Devices for Determining the Required Sight Adjustment for Indirect Firing, of which the following is a specification.

The present invention relates to a device for determining the required sight adjustment of guns. In the usual devices of this kind, a reading off device is provided for determining the sight adjustment, in which the reading is accomplished by observing the position of a point in relation to a number of curves, said point being determined by a mark. Such scales are inconvenient to read and apt to cause mistakes.

Figure 6:
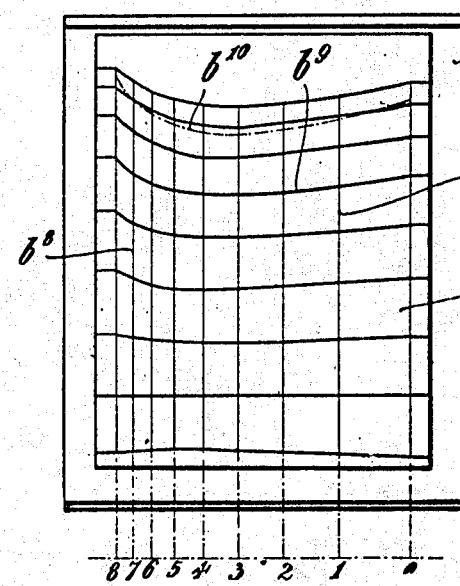

In the accompanying drawings two embodiments of the invention have been illustrated and Figure 1 shows a front view of a range finder on which the device has been incorporated; Fig. 2 a plan view of Fig. 1; Fig. 3 is a section in larger scale, along line 3—3 of Fig. 2, seen in the direction of arrow $x$; Fig. 4 likewise in larger scale, a section along line 4—4 of Fig. 3 seen from the left; Fig. 5 a section along line 5—5 of Fig. 3 seen from the left; Fig. 6 shows a detail in larger scale and Fig. 7 a side view of Fig. 6; Fig. 8 is a similar view as Fig. 3 and in the same scale of a part of a second embodiment of the invention.

Proceeding now to describe the first embodiment of the invention, and referring first to Figs. 3 and 4, A represents an inner cylindrical case of a rangefinder which case is firmly connected with an outer housing, in the main composed of two tubular end parts $A^1$ and a central cylinder $A^2$ connecting the two ends. This cylinder $A^2$ rests in two ball bearings $b^2$ connected by a casing $b^1$, seated on a foundation plate B, which is carried by the stand C. The rangefinder may be revolved around the longitudinal axis of its inner cylindrical case A by means of a worm D mounted in the casing $b^1$ and having a hand wheel $d^1$, said worm meshing with the teeth $a^3$ of the cylinder $A^2$. The rangefinder is provided with an objective $a^4$ at each end, and in the middle with an ocular $a^5$, through which both images from the objectives may be seen simultaneously in the usual manner. The optical axes of the objectives $a^4$ being parallel to each other, run at right angles to the revolving axis of the housing A $A^1$ $A^2$ of the rangefinder, and project themselves in points $w$ of Fig. 1. The ocular $a^5$ extends outward through a slit $b^3$ in the casing $b^1$, the length of this slit corresponding to the revolving angle of the rangefinder. The ocular also penetrates a ring $b^4$, mounted to revolve around the casing $b^1$ and covering the slit $b^3$. A box level $b^5$ is furthermore placed on the outside of the casing $b^1$, and the air bubble thereof will center itself when a certain longitudinal plane of the casing $b^1$ through the revolving axis of the housing A' $A^1$ $A^2$ of the rangefinder lies horizontal. Then, when the air bubble of the box level $b^5$ has been centered and the rangefinder has been directed on the target by means of the turning of the worm D, the angle between the optical axes of the objectives $a^4$ and the said plane will be identical with the field angle of the target or angle of sight.

Two sleeves E and F are rotatably mounted on the cylindrical inner case A of the rangefinder, provided with bevel gear teeth $e^1$ and $f^1$ respectively. A bevel wheel G in mesh with the gear teeth $e^1$ and $f^1$, is mounted in a bearing in the outer housing $A^1$ $A^2$ of the rangefinder and may be rotated by means of a small hand wheel $g^1$. The sleeve E is in connection with certain optical parts (not shown) situated inside the case A of the rangefinder, which optical parts may, in the usual manner be displaced by means of a rotation of the sleeve E, so that both images from the objectives $a^4$ will be visible in the same place in the ocular $a^5$. The amount of displacement of the said optical parts constitutes as is known, a measure of the distance of the observed object. And consequently, the amount of displacement between the sleeves E and F by means of the turning of the hand wheel $g^1$ and the bevel wheel G, also constitutes a measure of said distance.

A carrier frame $a^6$, see particularly Fig.

5, rigidly connected with the central cylinder $A^2$ and reaching inward through a slot therein, constitutes a bearing for two shafts H and J, one situated above the other, and whose revolving axes are parallel to the revolving axis of the sleeve F. Each of the shafts has rigidly attached thereto a toothed wheel $h^1$ and $i^1$ respectively. The wheel $h^1$ is in mesh with a spur wheel $i^2$ rigidly mounted on the shaft J, whereas the wheel $i^1$ is in mesh with a spur wheel $k^1$, made in one piece with the hollow shaft K, which is loosely mounted and made to turn on the shaft H. A sliding piece M, mounted on the shafts J and K and axially displaceable thereon, has a toe $m^1$ engaging a helical groove $f^2$ of steep, uniform pitch, cut in the sleeve F. By turning the sleeve F, the sliding piece M will consequently travel along the shafts K and J. An arm N is mounted to slide axially on the shaft K but without turning thereon. This arm is provided with a pointer $n^1$ which bears against the curved surface $b^7$ of the curved plate $b^6$ which is rigidly connected with the casing $b^1$. The arm N is mounted between the prongs of that part of the sliding piece M, which surrounds the hollow shaft K, so that the arm must follow every movement of said sliding piece while said arm has a slightly rocking movement together with the hollow shaft K around the axis of the shaft H dependent on the shape of the curved surface $b^7$. A sleeve P, having a toothed sector $p^1$ in mesh with a spur wheel $h^2$ rigidly fixed on the shaft H is mounted to turn on the sleeve F and coaxially therewith. This sleeve P is actuated by a helical spring Q which tends to turn the sleeve around the axis of the shaft H in a direction relative to the housing A $A^1$ $A^2$ of the rangefinder so that the pointer $n^1$ will be pressed against the curved surface $b^7$ through the coöperation of the gears and shafts K $k^1$ $i^1$ $i^2$ $h^1$ H $h^2$ $p^1$. The sleeve P has furthermore a pinion R mounted to turn thereon and in mesh both with the external teeth $f^3$ of the sleeve F and with the internal teeth $t^1$ of a drum T which is made to revolve relative to the cylinder $A^2$ and around the same axis. The drum T has on its outer surface an angular scale $t^2$ of uniform division, indicating the firing angle to which the gun-sight has to be set for the range and for the magnitude of the field angle which have been defined by the adjustment of the rangefinder. The scale $t^2$ is visible from the outside through a window $a^7$ at the edge of which is scribed a mark $a^8$ against which the scale is read off.

As already described, every range to which the rangefinder is adjusted by means of the hand wheel $g^1$ corresponds to a certain angular position of the sleeve F. From this follows also that every range corresponds to a certain axial displacement of the slide piece M as well as of the arm N. The ratios have been so chosen that the arm N stands at its extreme right position, Fig. 3, with the rangefinder set for zero range; and at its extreme left position, in the same figure, with the rangefinder set for maximum range, say 8000 meters. The line in axial direction which the pointer $n^1$ of the arm N follows on changing the range from zero to 8000 meters represents the length of the curved surface $b^7$ and has been marked 0—8 in the dot and dash line at the bottom in Fig. 6, which shows the curved plate $b^6$ from the same point of view as Fig. 3. The axial displacements of the pointer $n^1$ corresponding to the intermediate ranges of 1000, 2000, 3000, 4000, 5000, 6000 and 7000 meters are marked respectively 1, 2, 3, 4, 5, 6 and 7.

Figure 7:
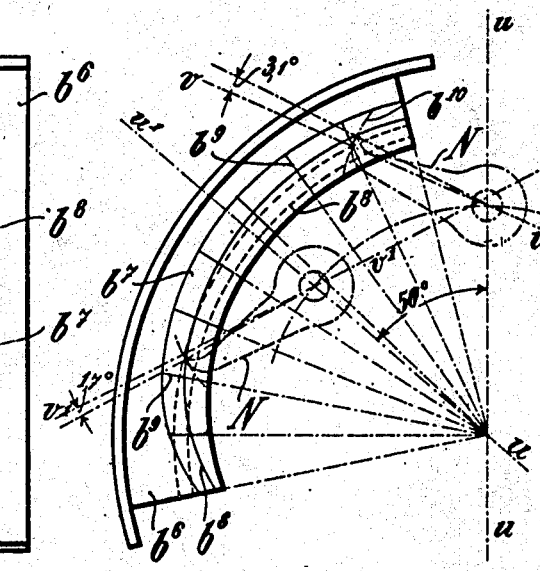
Figure 8:
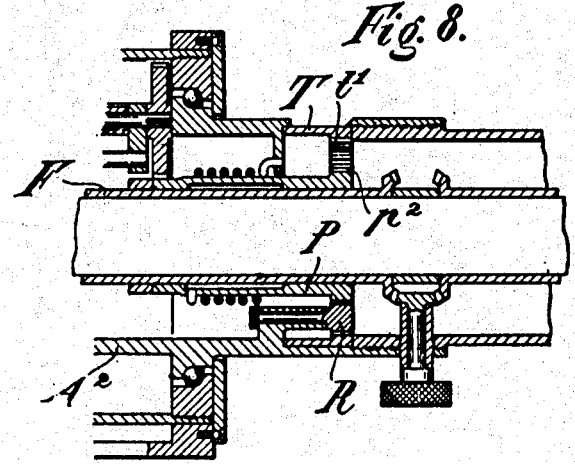

In order to better illustrate the shape of the curved surface $b^7$, the curves marked $b^8$ have been indicated in Figs. 3, 6 and 7, wherein the plane, in which the pointer $n^1$ moves on turning the arm N about the axis of the shaft H, intersects the curved surface $b^7$ when displacing axially the arm N to correspond with the above mentioned intermediate ranges. For the sake of clearness, only the curves $b^8$ corresponding to the ranges 7000 and 1000 meters have been drawn in Fig. 7. Besides these curves $b^8$, transverse curves $b^9$ have been indicated in Figs. 6 and 7 where the curved surface $b^7$ is intersected by a number of planes of the same angular distance from each other, running through the axis of the cylinder $A^2$. Neither curves $b^8$ nor $b^9$ are in practice scribed on the curved surface $b^7$. Before going more into detail of the shape of the curved surface $b^7$ it will be best to describe the relation existing between the revolving angle of the drum T and the revolving angles of the sleeve F and the arm N.

It has already been pointed out that there is a direct positive connection between the drum T and the arm N, with the sleeve F at rest, through the gearing K $k^1$ $i^1$ $i^2$ $h^1$ H $h^2$ $p^1$ P R $f^3$ $t^1$. The ratio of this gearing has been chosen so that a certain revolving angle of the arm N will correspond to the possibly greatest revolving angle of the drum T. Furthermore there exists a positive connection between the sleeve F and the drum T through the gearing $f^3$ R $t^1$ with unchanged angular position of the arm N. If the angular position of the arm N changes simultaneously with that of the sleeve F, the revolving angle of the drum T will be equal to the sum of the revolving angles which would obtain from only turning the arm N with the sleeve F fixed, on the one hand, and from only turning the sleeve F with the angular position of the arm N unchanged on the other hand.

If $n$ denotes the revolving angle of the arm N; $f$ the revolving angle of the sleeve F; $t_1$ the revolving angle of the drum T obtained with the sleeve F standing still; $t_2$ the revolving angle of the drum obtained with unchanged angular position of the arm N; $t$ the actual revolving angle of the drum T; $i = \dfrac{t_1}{n}$ the ratio of the gearing K $k^1$ $i^1$ $i^2$ $h^1$ H $h^2$ $p^1$ P R $f^3$ $t^1$ and $j = \dfrac{t_2}{f}$ the ratio of the gearing $f^3$ R $t^1$, so follows that $$t = t_1 + t_2 = in + jf,$$

and the revolving angles $n$ and $f$ will be positive or negative according to whether the corresponding angles $t_1$ and $t_2$ run in the same or the opposite direction as regards a conventionality predetermined direction of the drum T. With the assistance of these characters it will be easy to determine the shape of the curved surface $b^7$. Considering now the rangefinder to be set at zero range and 0° field angle, by turning the little hand wheel $g^1$ and worm D respectively, so that the pointer $n^1$ is situated at the right hand end of the curved surface $b^7$, and that the optical axis of the objectives $a^4$ make an angle of 0° with the longitudinal plane of the casing $b^1$, which plane has been brought into a horizontal position by the centering of the air bubble of the level $b^5$. The angular positions in which the sleeve F, the arm N and the drum T, now are situated by this adjustment of the rangefinder will be known as the zero position; from which the revolving angles $f$, $n$ and $t$ are to be measured. The mark $a^8$ points now at zero on the scale $t^2$ with the above mentioned adjustment of the rangefinder. The direction of revolution of the drum T by which the mark $a^8$ indicates an ever increasing firing angle will be considered as positive.

To determine the curvature of the surface $b^7$ it is sufficient to determine the shape of the curves $b^8$, the axial position of which has already been explained above. Each of these curves corresponds to a certain range and indicates the path along which the pointer $n^1$ of the arm N travels, when the rangefinder is being adjusted to different field angles with a fixed adjustment of the range concerned. As an example, the shape of that particular curve $b^8$ will be explained, which corresponds to the 7000 meter range, and the point on said curve corresponding to the 0° field angle be determined. The pointer $n^1$ of the arm N has traveled in the axial direction from 0 to 7, Fig. 6, when being adjusted to 7000 meters. Supposing that the greatest displacement, 0 to 8 corresponds to a revolving angle of the sleeve F having a value of 360° and that the ratio between the lines 0 to 7 and 0 to 8 has a value of 0.95, it will follow that the revolving angle of the sleeve F corresponding to a range of 7000 meters will have a value of $$f = 0.95 \times 360° = 342°.$$

Supposing further, that the ratio $j$ of the gears $f^3$ R $t^1$ has a value of 0.615 and that the arm N has retained its initial angular position, we will have for the drum T a revolving angle $$t_2 = j \times f = 0.615 \times 342° = 210°.$$

From the firing table may now be found what firing angle corresponds to a field angle of 0° at a range of 7000 meters, and it will thereupon be easy to complete what angle $t$ the drum T actually has to be revolved to permit the mark $a^8$ to show this firing angle on the scale $t^2$.

With the supposition, that this angle is $$t = 228°$$

then is $$t_1 = t - t_2 = 228 - 210° = +18°$$

When the ratio of the gearing K $k^1$ $i^1$ $i^2$ $h^1$ H $h^2$ $p^1$ P R $f^3$ $t^1$ has been assumed to be $$i = 5.8$$

the value of the revolving angle of the arm N will be $$n = \dfrac{t_1}{i} = \dfrac{+18°}{5.8} = +3.1°.$$

The point of the particular curve $b^8$ that corresponds to the field angle 0° has then been determined. This is namely the point which is indicated by the pointer $n^1$ of the arm N when this arm has been turned 3.1° in the positive direction from the zero position, represented by the line $v$—$v$, Fig. 7, with the cylinder $A^2$ in the angular position that corresponds to the field angle 0° represented by line $u$—$u$.

Proceeding now to determine another point on the curve $b^8$ that corresponds to the 7000 meter range, for instance a point that represents a field angle of 50°; the firing angle has then first to be found in the firing tables at which the target will be hit at a range of 7000 meters with a field angle of 50°. And from this may then easily be computed the angle $t$ which the drum T has to be turned out of its zero position in order to have the mark $a^8$ show the correct firing angle on the scale $t^2$. Assuming this to be $$t = 200°,$$

the angle $t_2$ amounts as before to 210°. Therefore is $$t_1 = t - t_2 = 200° - 210° = -10°$$

and $$n = \dfrac{t_1}{i} = \dfrac{-10°}{5.8} = -1.7°.$$

To find the desired point, the cylinder $A^2$ has consequently to be turned 50° into the angular position represented by line $u^1-u^1$, while the zero position of arm N is represented by line $v^1-v^1$, whereupon the arm N has to be revolved an angle of 1.7° in the negative direction away from its present zero line $v^1-v^1$. The desired point is namely the one indicated by the pointer $n^1$ of the arm N. If the described procedure is repeated for a number of other field angles, the shape of the curve $b^s$ representing a range of 7000 meters may be determined with sufficient accuracy. In a similar manner, the curves $b^s$ for all other ranges may also be determined, and the problem of finding the curvature of the whole surface $b^7$ has been solved.

If all the points, denoting a field angle of 0° on the curved surface, were connected, a curve $b^{10}$, indicated by a dot and dash line and representing the path along which the pointer $n^1$ of the arm N travels will be obtained when the rangefinder is being adjusted for different ranges by turning the hand wheel $g^1$ at the same time keeping the field angle constantly at 0°.

In order to ascertain by means of the described device the firing angle in which the gun is to be laid for firing against a target, situated, for instance, at a range of 7,000 meters and on a height corresponding to a field angle of 50°, the following operations have to be made: The foundation plate B, is first leveled by means of the level $b^5$. The optical axes of the objective $a^4$ are then situated in a horizontal plane. The optical axis of one of the objectives $a^4$ is thereupon directed against the target by means of turning the foundation plate B around a vertical axis, thereby giving the housing $A^1 A^2$ the necessary transverse direction, and by thereupon swinging it around its longitudinal axis by turning the hand wheel $d^1$, until the optical axis is directed on the target, whereby two images of the target will be visible in the sighting field of the ocular $a^5$. The housing $A^1 A^2$ has now an angular position corresponding to the field angle (50°) of the target. The small hand wheel $g^1$ has thereupon to be turned until the two images of the target show in the same position in the field of the ocular $a^5$. The sleeve F will thereupon obtain a position corresponding to the range (7000 meters). The mark $a^s$ will then show on the scale $t^s$ of the drum $t$, the firing angle to be given to the gun corresponding to the range and the field angle of the target.

The second embodiment of the invention illustrated in Fig. 8 differs from the embodiment just described only therein, that the external teeth $f^2$ of the sleeve F are left out, and that the pinion R, in mesh with the internal teeth $t^1$ of the drum T and mounted in a bearing on the cylinder $A^2$, also meshes with the external teeth on the sleeve P. As a consequence the turning of the sleeve F, while the arm N (and with it the sleeve P) has a constant angular position, cannot cause the drum T to rotate, as was the case in the first embodiment. The revolving angle of the drum T is rather in this case dependent on the revolving angle of the arm N. As the revolving angle of the arm N has always to be made comparatively small, for the purpose of avoiding the occurrence of the checking of its travel on the curved surface $b^7$; and as furthermore an enlargement of the revolving angle can only be made within a limited degree through the gearing that transmits the turning of the arm N to the drum T; the revolving angle of the drum T will therefore be smaller in the second embodiment of the invention than in the first; under otherwise similar conditions, and the divisions on the scale $t^s$ will consequently also be less distinct. For this reason the first embodiment will have the preference, as therein the drum T by the turning of the sleeve F alone can be given a considerable turning and the turning of the arm N is only used to correct the revolving angle of the drum T.

I claim:—

1. An instrument for determining the required setting of a gun sight comprising a setting member for the range, a second setting member for the field angle of the object, an indicator which gives the reading for the required setting of the gun sight, comprising an index on one of the setting members and a member coöperating therewith carrying a scale, gearing interposed between the setting members and the scale, and means actuated by the motion of the setting members and connected to the gearing to make allowance for the firing angle.

2. In a device for determining the required gun sight adjustment, the combination with a mounting, an adjustable member for elevation, a drum and a second adjustable member for range; of an observation scale comprising a graduation on said drum and an index on said first adjustable member; connections between said first adjustable member and said drum adapted to displace the drum relative to said first adjustable member, an amount recorded on the observation scale, corresponding to the field angle adjustment of said first member with regard to the target, and means for displacing the drum relative to said second adjustable member an amount also recorded on the observation scale corresponding to the firing angle for the range at the said field angle adjustment.

3. In a device for determining the required gun sight adjustment, the combination with a mounting, an adjustable member, a drum and a second adjustable member; of an observation scale comprising a graduation on said drum and an index on said first adjustable member; connections between said first adjustable member and said drum adapted to displace the drum relative to said first adjustable member, an amount recorded on said observation scale, corresponding to the field angle adjustment of said first member with regard to the target; connections between said second adjustable member and said drum, adapted to displace the drum relative to said second adjustable member an amount recorded on the observation scale, corresponding to the firing angle for the range at the said field angle adjustment.

4. In a device for determining the required gun sight adjustment, the combination with a mounting, a housing, a drum and a sleeve, of an observation scale comprising a graduation on said drum and an index on said housing, a set of gears between said housing and said drum adapted to displace the drum relative to said housing and independent of said sleeve, an amount recorded on the observation scale corresponding to the field angle adjustment of said housing with regard to the target; a portion of said set of gears between said sleeve and said drum, adapted to displace the gun relative to the sleeve and independent of said housing an amount recorded on the observation scale corresponding to the firing angle for the range at said field angle adjustment.

5. In a device for determining the required gun sight adjustment the combination with a mounting, a housing adapted to rotate in said mounting, a drum revoluble in said housing and a revoluble sleeve mounted co-axially with said drum and said housing; an observation scale comprising a graduation on said drum and an index on said housing; external gear teeth on said sleeve; internal gear teeth in said drum; a pinion in mesh with both said external and internal gears, said pinion revolubly mounted in a casing surrounding said sleeve and adapted to rotate thereon; a spring between said housing and said pointer tending to turn the casing in one direction; a cam plate attached to said mounting; a pointer actuated by said cam plate and mounted to oscillate in said housing in cooperation with gear wheels between said pointer and said casing constructed to increase the revolving angle of said drum relative to the revolving angle of said pointer; a helical groove in said sleeve; a sliding piece guided in said housing and adapted to have axial displacement, said sliding piece engaging said groove and said pointer operated by said sliding piece.

6. In a device for determining the required gun sight adjustment, the combination with a mounting, a housing, a drum and a sleeve; of an observation scale comprising a graduation on said drum and an index on said housing, said observation scale adapted to record only the angular displacement of said housing when adjusted to the field angle of the target alone, and to record the angular displacement of said sleeve when adjusted for the firing angle of the range at said field angle, whereby said scale will record the resultant reading of both said adjustments, when said housing and said sleeve are simultaneously adjusted, or one directly after the other.

The foregoing specification signed at Barmen, Germany, this 3rd day of October, 1911.

OTTO SCHMITZ. [L. S.]

In presence of—
L. NUFER,
A. NUFER.